MOTOR VEHICLE, ESPECIALLY PASSENGER MOTOR VEHICLE

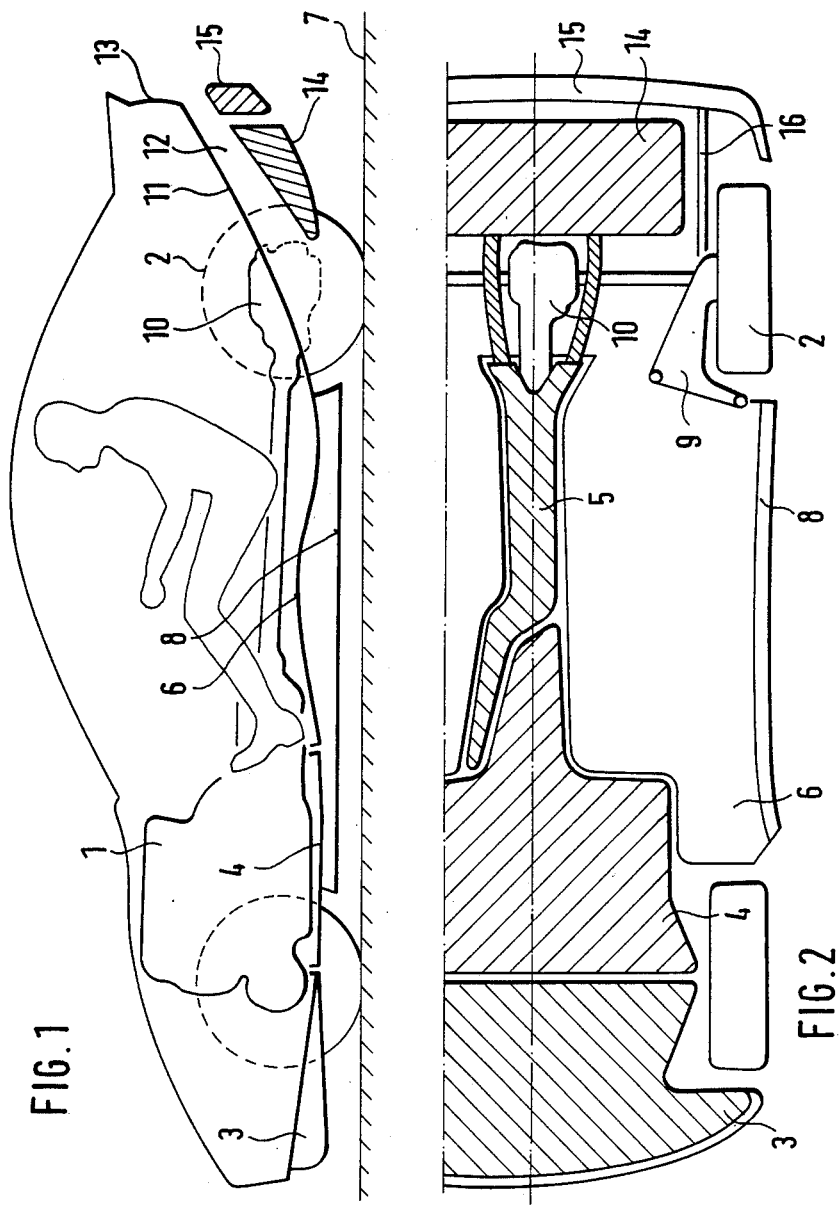

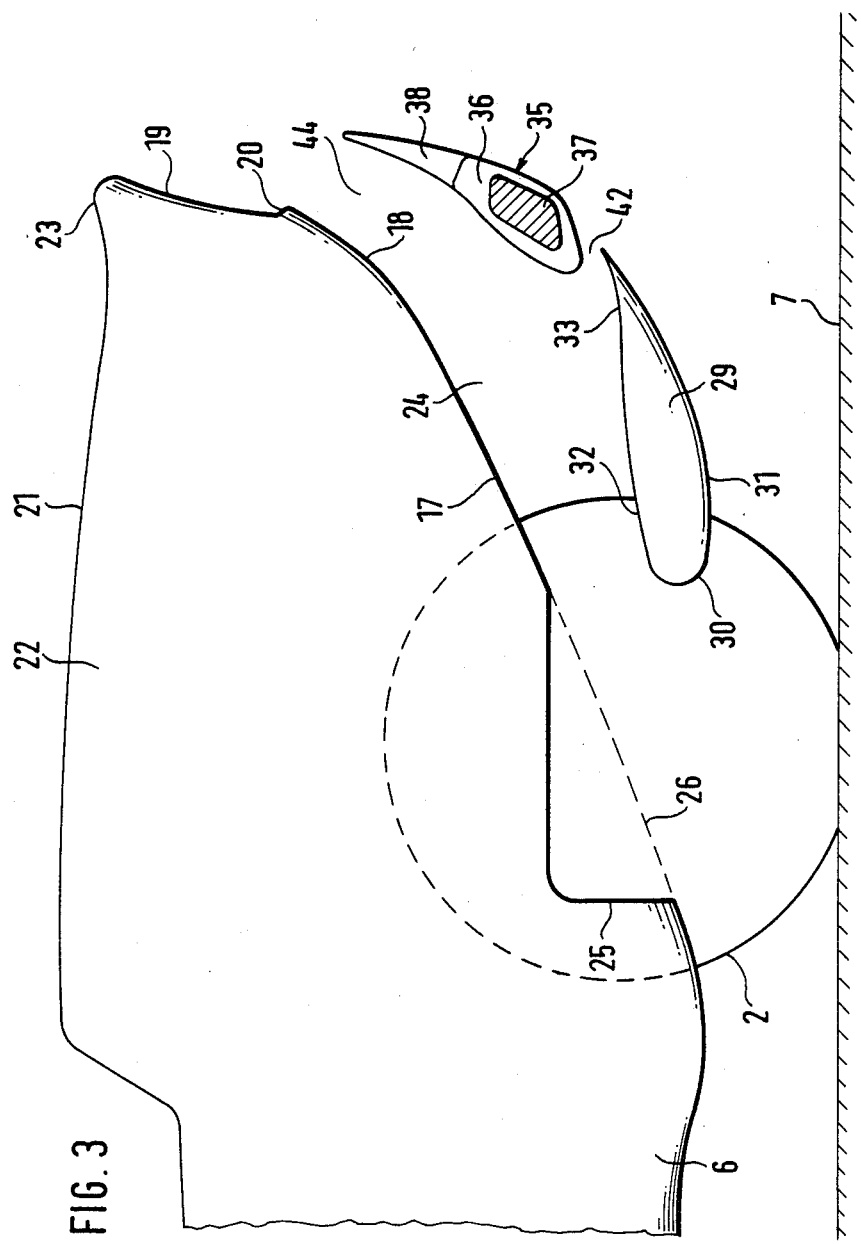

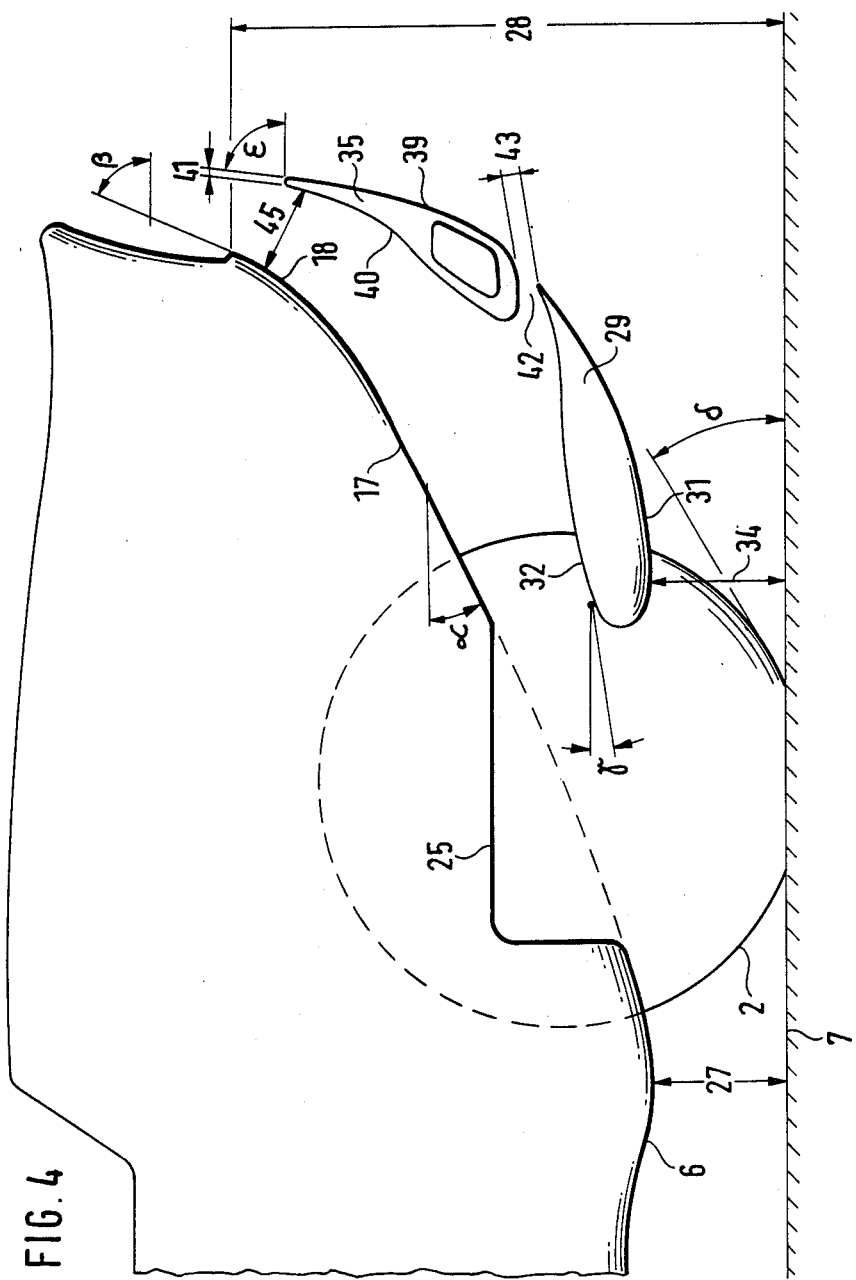

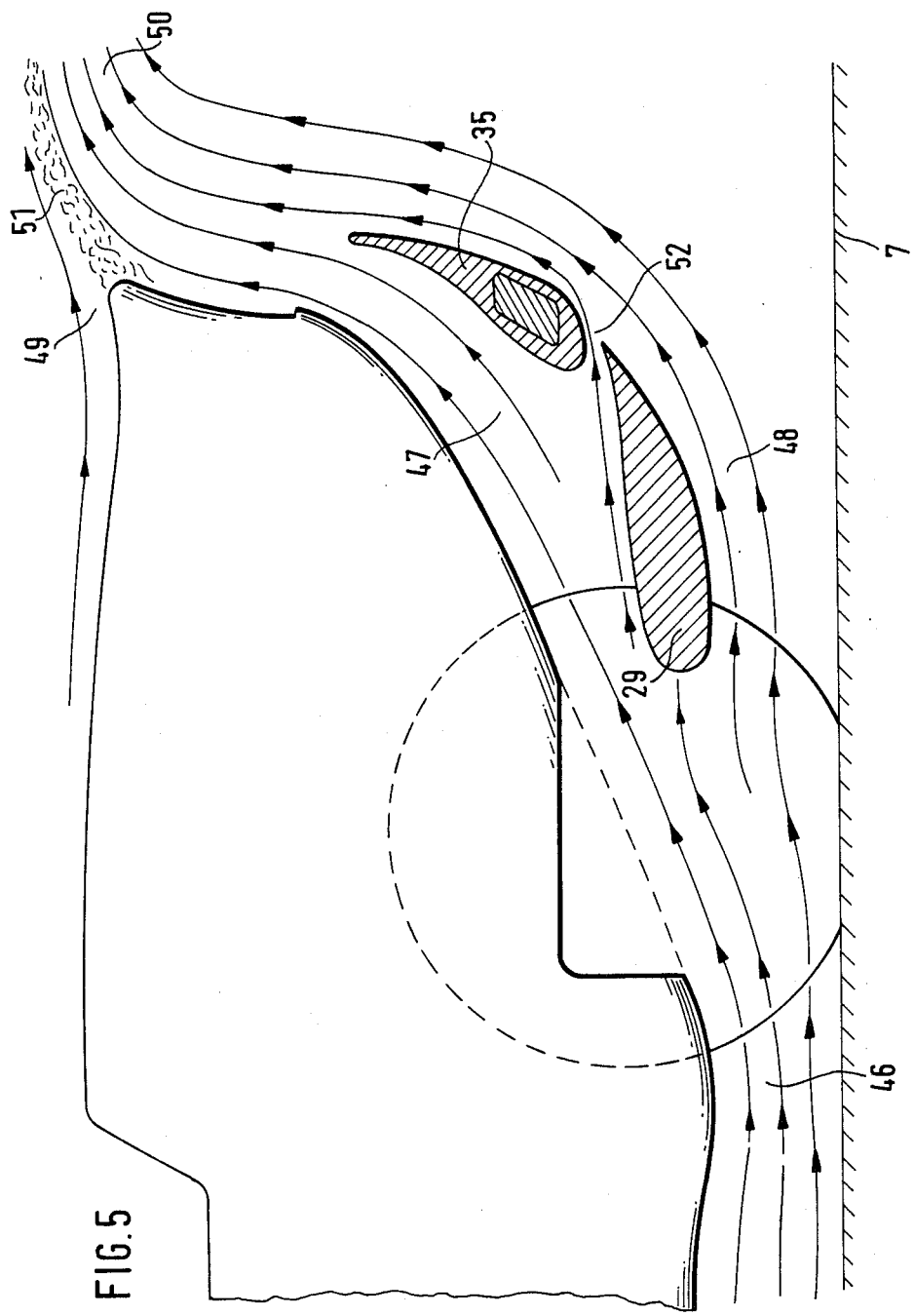

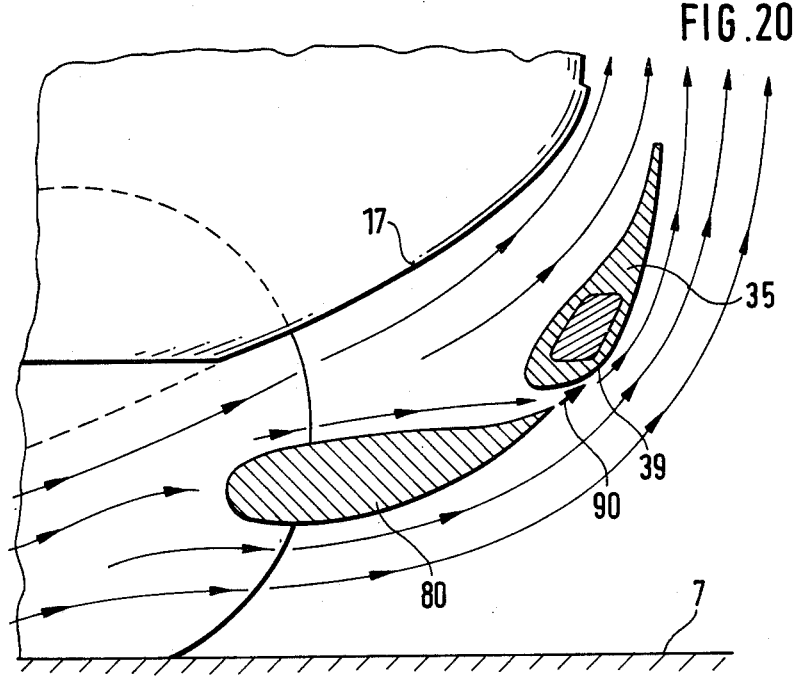
FIG. 20
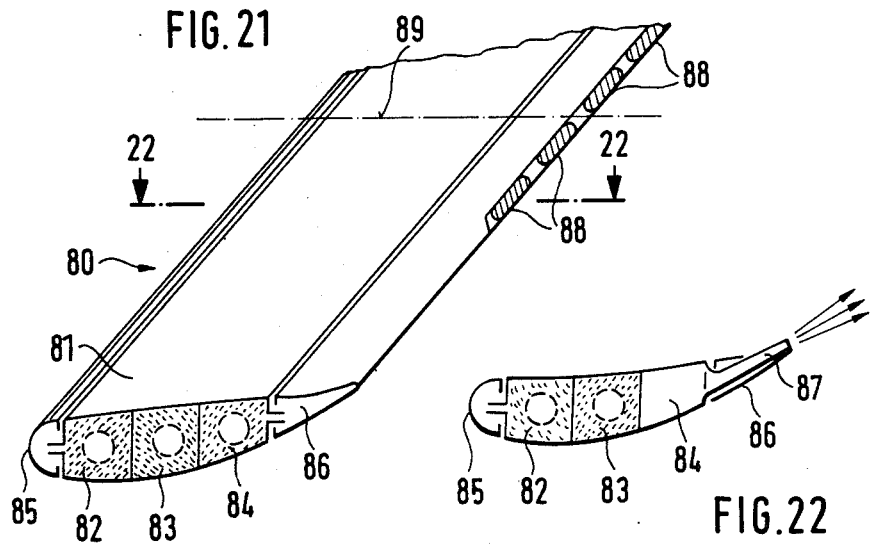
FIG. 21
FIG. 22

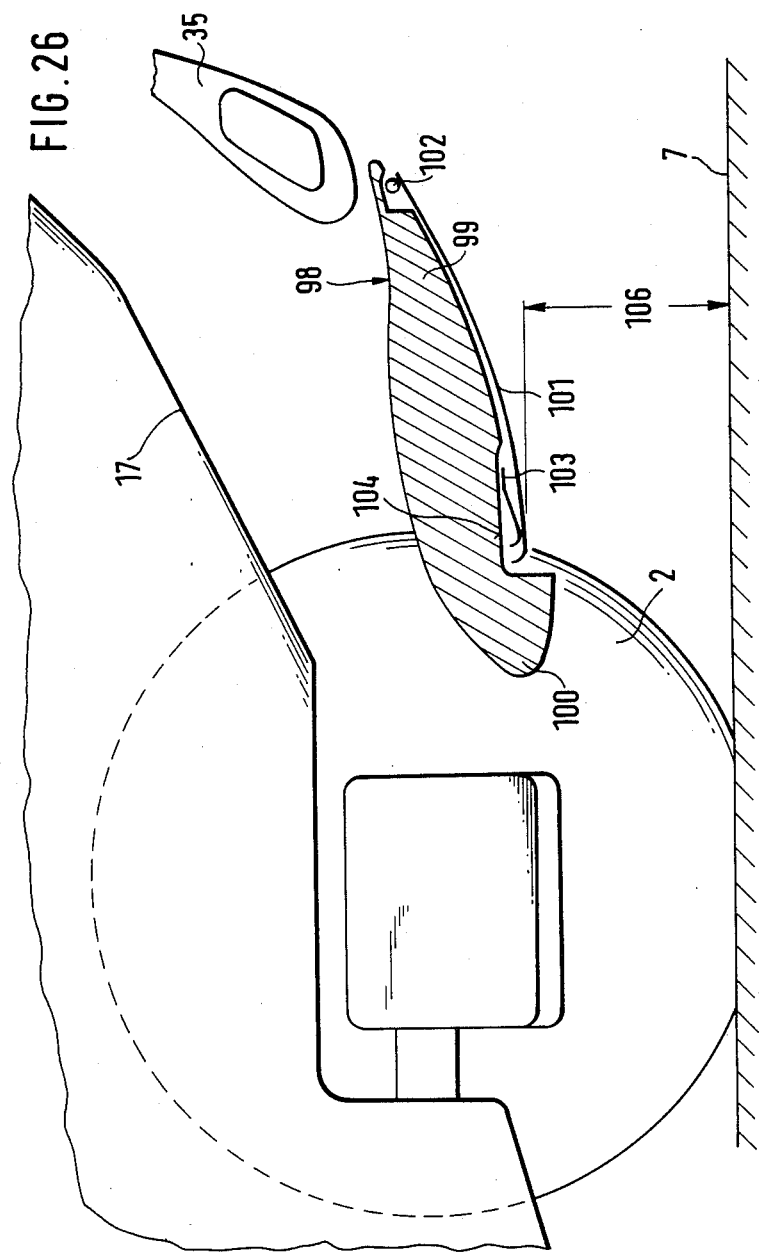

BACKGROUND AND SUMMARY OF THE INVENTION

The present invention relates to a motor vehicle, especially to a passenger motor vehicle in which for purposes of achieving road traction of the vehicle, the vehicle floor in the rear area is constructed essentially smooth-surfaced and rising toward the vehicle end and an air foil is arranged in the space underneath the rising rear floor, where a negative lift becomes effective with an incident flow coming from the vehicle front section.

In a known motor vehicle of this type which is constructed as passenger motor vehicle, the vehicle floor is bent upwardly shortly before its rear end and the air foil which in plan view has the shape of a section of a circle whose circular arc forms the front edge of the air foil, is arranged underneath the horizontal vehicle floor located in front of the bending place and of the rising rear floor in such a manner that it adjoins with its rear, upwardly directed end the inclined surface formed by the rising rear floor so that the inflowing air is conducted toward both vehicle sides (French Patent No. 1,529,933).

In another known passenger motor vehicle (U.S. Pat. No. 4,379,582, JP-GM-OS Sho No. 55-117369), a rear bumper unit is provided which includes a main bumper secured at the vehicle body and a further bumper which is arranged underneath the main bumper while leaving free an inclined rearwardly rising air opening, and which is secured at the main bumper. The further bumper as also its mountings consist of shock-absorbing elastic material, is constructed as air foil with inverted air foil profile and with its forward end protrudes over the forward area of the main bumper forwardly underneath the rear end of the rear section of the vehicle body.

A further passenger motor vehicle with an air foil having an air foil profile which is arranged underneath the rear area of the vehicle body and guides inflowing air coming from the front obliquely rearwardly, is disclosed in the JP-GM-OS Sho No. 52-63828.

The known air foils are always arranged only in the rear area. They act essentially as air guide devices.

The present invention is concerned in the first instance with the task to provide a motor vehicle of the aforementioned type which is suitable for the practical use in the usual road traffic and has an aerodynamic configuration which assures a good road traction, especially also at high driving velocities.

The underlying problems are solved according to the present invention in that the forward end of the rising rear floor is arranged at least approximately within the area of the vehicle rear axle, in that the rising rear floor forms the top side of a rear diffusor whose bottom side is formed by the road surface, and at the vehicle end has a considerable spacing from the vehicle-tire contact surface (road surface), and in that the air foil is so arranged that it protrudes with its forward end into the space between the vehicle rear wheels and its bottom side has at least the same distance from the vehicle tire contact surface as the vehicle floor at its lowest place in the vehicle areas located in front of the vehicle rear section. It is achieved thereby that a considerable negative lift dependent on driving velocity is produced at the vehicle rear section with simple means without a deviation of the external configuration of the vehicle from the usual configuration in a disturbing manner, which configuration is fixed far-reachingly by legal rules and regulations and by practical requirements. The present invention is advantageous in particular for smaller and more light-weight vehicles, especially for sporty two-seaters. It enables not only a good traction but also the production of high lateral guide forces and therewith a good tracking and driving stability. It can be used in vehicles with different types of drive, for example, in vehicles with a standard drive, i.e., with a forwardly arranged engine and a rear wheel drive, in vehicles with front engine and front wheel drive or in those with four wheel drive.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 1 is a partial schematic side elevational view of a first embodiment of a passenger motor vehicle in accordance with the present invention, illustrated in part in cross section;

FIG. 2 is a partial bottom plan view of the passenger motor vehicle according to FIG. 1;

FIG. 3 is a schematic longitudinal cross-sectional view through the rear part of a second embodiment of a passenger motor vehicle in accordance with the present invention;

FIG. 4 is a schematic view, similar to FIG. 3, illustrating the geometric coordination in the passenger motor vehicle of FIG. 3;

FIG. 5 is a schematic view illustrating the air flow in the passenger motor vehicle according to FIG. 3, indicated by flow lines;

Figure 6:
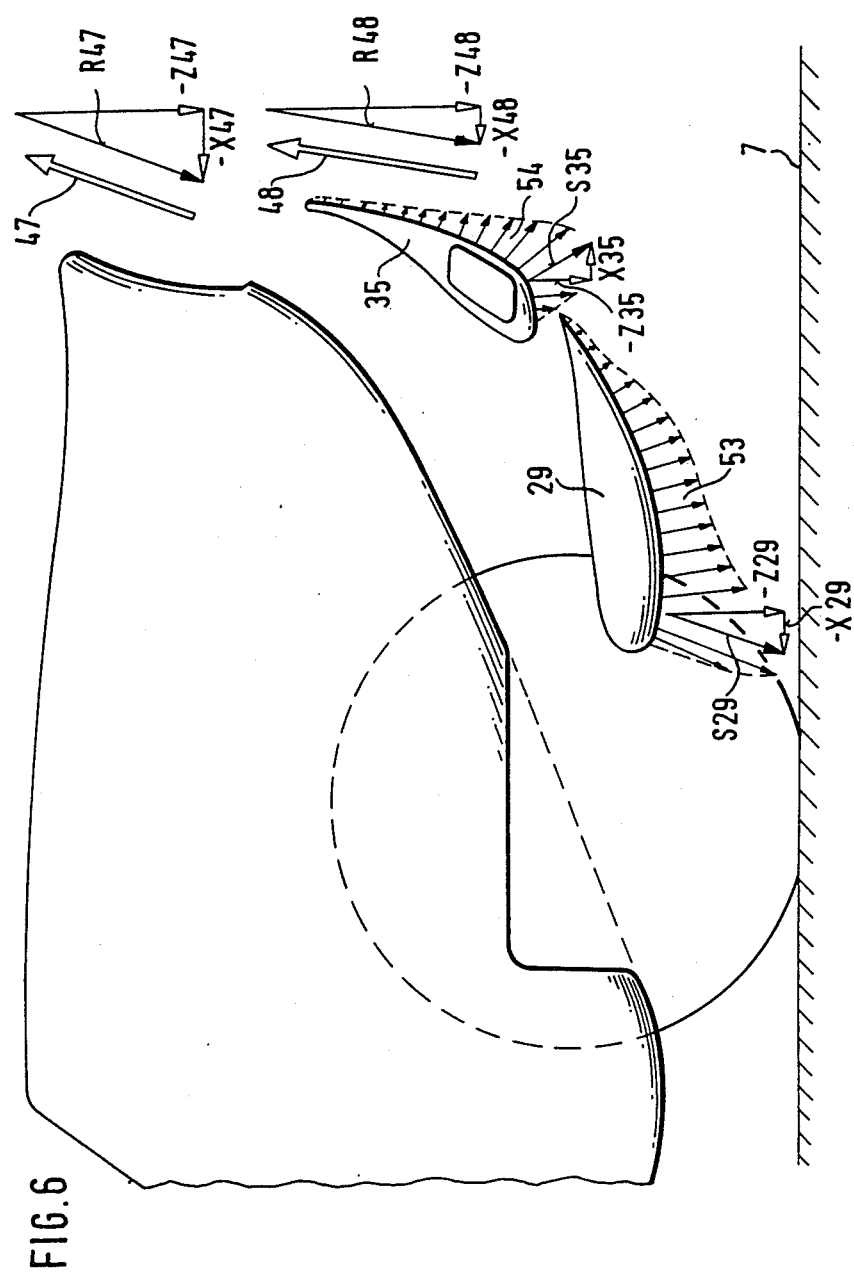
FIG. 6 is a schematic view illustrating the pressure distribution caused by the air flow and pressures and forces caused thereby at the passenger motor vehicle according to FIG. 3.

relatively light-weight rear end of the vehicle. It is thereby taken into consideration that the ground clearance of the vehicle body is variable in dependence on the load of the vehicle and the respective driving conditions and the floor contour in the transition area between the central floor 6 and the rear floor 11 and the outflow tangent of this transition area are to be designed for an optimum flow with respect to the air foil 14 so that notwithstanding a differing inflow, the function of the rear diffusor 12 and of the air foil 14 is always assured also in case of extreme positions of the vehicle body. In order to achieve a height position of the vehicle body which remains the same as much as possible and additionally is as low as possible, it may be advantageous to utilize a level regulation at least at the rear axle.

The second passenger motor vehicle according to FIGS. 3 to 6 differs from the first passenger motor vehicle according to FIGS. 1 and 2 especially by the rear area of the rear floor and the configuration of the air foil and of the rear bumper.

According to FIGS. 3 to 6, the rear floor 17 is not constructed flat in its rear area but is constructed slightly convexly curved so that a rounded-off diffusor termination 18 is formed. The rear end of the rear floor 17 adjoins the lower end of the rear terminal wall 19 which in its lower area is constructed slightly concavely curved so that a sharp (detachment) edge 20 is formed at the rear end of the rear floor 17. The transition between the rear terminal wall 19 and the upper wall 21 of the vehicle rear section 22 is constructed as rear spoiler 23. Within the area of the vehicle rear axle (not shown) the rear floor 17 is drawn upwardly over at least a part of the vehicle width in order to create space for the movable drive parts of the drive unit of a driven rear axle. The rear diffusor 24 exhibits within this area a disturbance owing to the recess 25, however, is not significantly impaired thereby in its overall function. With a front wheel drive vehicle, the rear floor, deviating therefrom, may extend uniformly and uninterruptedly also within the area of the non-driven vehicle rear wheels essentially over the entire vehicle width above the vehicle rear axle as top side of the rear diffusor from its forward area to its rear area. This is indicated by a dash line 26.

At the forward end of the rear floor 17, where the latter passes over into the central floor 6, the rear floor 17 has a spacing 27 (FIG. 4) from the road surface 7 which, however, is not constant but is variable in dependence on the load of the vehicle and the instantaneous driving conditions. To the rear of the transition area between the central floor 6 and the rear floor 17, the rear floor 17, which rises rearwardly obliquely, has in its center area an essentially constant slope. The angle of inclination $\alpha$ which is subtended by the center area of the rising rear floor 17 and the horizontal amounts to about 25° but may also assume different values between approximately 10° and approximately 40° in other realizations. In the rear area of the rear floor 17 in which the latter is curved convexly, the slope increases gradually. The tangent at the rear end of the rear floor 17 subtends with the horizontal an angle of inclination $\beta$ of about 70°. This angle, however, may also assume different values, for example, between about 40° and about 90° with different realizations. The rear end of the rear floor 17, where a sharp detachment edge 20 (FIG. 3) is formed, has a spacing 28 (FIG. 3) from the road surface 7 which is more than four times as large as the distance 27 of the forward end of the rear floor 17 from the road surface 7 and approximately as large as the diameter of the vehicle rear wheels 2.

An aerodynamic body is provided as air foil 29 whose front portion 30 is constructed well-rounded-off to assure a detachment-free circumcirculation of the air foil 29. The bottom side 31 of the air foil 29 is curved convexly and forms the vacuum or suction side of the air foil 29. The top side 32 of the air foil 29 is constructed far-reachingly flat, but may also be constructed slightly convexly. It forms the pressure side of the air foil 29. At the rear end of the air foil 29, the top side 32 thereof has a flat concave recess 33 (FIG. 3). The rear end of the air foil 29 terminates approximately wedge-shaped.

The air foil 29 is arranged essentially flat. It rises slightly from in front toward the rear. The angle $\gamma$ subtended by the front area of the top side 32 of the air foil 29 with the horizontal amounts to approximately 10°, but may also assume other values approximately between 5° and approximately 30° with different realizations. The angle of attack is to be so selected that a maximum vacuum results at the bottom side 31 of the air foil 29. The bottom side 31 of the air foil 29 has at its lowest place a spacing 34 from the road surface 7 which is at least as large as the spacing 27 which the forward end of the rear floor 17 has from the road surface 7 so that a touching-down of the air foil 29 on the ground for reasons of inadequate road clearance is precluded. The air foil 29 is additionally arranged in such a manner that a boundary curb angle remains free above the road surface 7. The air foil 29 protrudes approximately with its forward third into the space between the two vehicle rear wheels 2. It is arranged underneath the rear half of the center area of the rear floor 17. Its front edge lies approximately underneath the rear end of the recess 25.

An auxiliary after-air foil 35 is connected in series with and to the rear of the air foil 29 so that the air foil 29 acts as main air foil. The supporting component of the auxiliary air foil 35 is the rear bumper 36 which has a bumper core 37 and is provided within the area to the rear of the air foil 29 with an upwardly projecting tongue-like air guide extension 38 extending approximately over the width of the air foil 29. The rear bumper 36 together with the air guide extension 38 is also constructed as air foil profile in the area to the rear of the air foil 29 in which it is component of the auxiliary air foil 35, so that in case of an in-flow from the vehicle front section a negative lift becomes effective also at the auxiliary air foil 35. The auxiliary air foil 35 is arranged in an essentially steep manner. Its backside 39 (FIG. 4) is constructed convexly curved. Its front side 40 is constructed convexly curved in the lower area and concavely curved in the upper area. The upper area of the auxiliary air foil 35 therefore has an only slight tapering. It terminates essentially blunt. At the rear end, the auxiliary air foil 35 is to be constructed as thin as possible. A thickness of about 10 mm. to about 60 mm. is practically realizable. The rear area of the auxiliary air foil 35 subtends with the horizontal an exit angle $\epsilon$ of about 80°. This angle may assume optimum values between about 50° and about 90° with other realizations. The length of the auxiliary air foil 35 in the flow direction amounts to approximately 80% of that of the air foil 29 but may also assume different values, for example, between about 30% and about 80% of the length of the air foil 29.

The auxiliary after-air foil 35 is arranged obliquely under and to the rear of the rear area of the rear floor 17. Its forward end is located above the rear end of the air foil 29. A through-flow gap 42 is present between the rear end of the air foil 29 and the forward end of the auxiliary air foil 35 whose gap width 43 amounts to approximately 10 to 60 mm. in the vertical direction. The bottom side 31 of the air foil 29 and the backside 39 of the auxiliary air foil 35 form at least approximately a continuous curved configuration interrupted only by the gap 42. The rear area of the air foil 29 is so shaped that there is no flow detachment at the backside 39 of the auxiliary air foil 35. The air foil 29 and the auxiliary air foil 35 act together as a gap-air foil in which the air flowing through the gap 42 enhances an attachment of the flow at the backside 39 of the auxiliary air foil 35. The distance of the air guide device formed by the air foil 29 and the auxiliary air foil 35 from the rear floor 17 increases from a starting distance at the forward end of the air foil 29 toward the rear, reaches its maximum value approximately at the transition from the air foil 29 to the auxiliary air foil 35 and thereupon is again reduced toward the rear approximately to the starting value. The rear area of the rear floor 17 together with the front side of the auxiliary air foil 35 forms thereby a nozzle 44 (FIG. 3) with an essentially upwardly and slightly rearwardly directed outflow or exit direction. The outflow opening of the nozzle 44 can have an interior width 45 (FIG. 4) of about 30 mm. to about 200 mm. between the rear area of the rear floor 17 and the front side 40 of the auxiliary air foil 35.

The air, which flows from the vehicle front section underneath the vehicle rearwardly in a closed stream 46, is divided upon entry into the rear diffusor 24 into two partial streams 47 and 48 (FIG. 5). The upper partial stream 47 flows through the space between the rear floor 17 and the top side 32 of the air foil 29 and the front side 40 of the auxiliary air foil 35. The lower partial stream 48 flows along the bottom side 31 of the air foil 29 and along the backside 39 of the auxiliary air foil 35. To the rear of the auxiliary air foil 35, the two partial streams 47 and 48 recombine and flow together toward the upper end of the vehicle rear section, where they meet with the air flow 49 flowing along the vehicle top side, with which they flow off together toward the rear as summation stream 50. Only a comparatively small region of detached flow 51 results thereby at the upper end of the vehicle rear section. The gap flow 52 through the through-flow gap 42 between the rear end of the air foil 29 and the forward end of the auxiliary air foil 35 is of considerably significance for a substantially detachment-free circumcirculation of the auxiliary air foil 35, i.e., a circumcirculation exhibiting a small detachment. It is forcibly obtained by the above-described configuration and shape within the area of the through-flow gap 42.

The air flow effects a pressure distribution 53 along the bottom side 31 of the air foil 29 and a pressure distribution 54 along the backside 39 of the auxiliary air foil 35 as shown in FIG. 6. The vacuum values, which result with a predetermined in-flow that results at a predetermined vehicle velocity, are thereby shown as vectors along the air foil contours. A suction force S29, respectively, S35 will establish itself at the two air foils 29 and 35. The resulting suction force 29 which is effective at the air foil 29 can be decomposed into a negative lift component $-Z29$ and into a propulsion component $-X29$. In a corresponding manner, the resulting suction force S35 which is effective at the auxiliary air foil 35, can be decomposed into a negative lift component $-Z35$ and into a driving resistance component X35.

The partial streams 47 and 48, which exit obliquely upwardly and rearwardly, produce reaction forces R47 and R48 which can also be decomposed into corresponding components $-Z$ and $-X$. The sum of all -Z-components produces the aerodynamic lift, respectively, the aerodynamic negative lift.

In deviation from the illustrated embodiment, an air guide device may be provided which, in lieu of two separate air foils, includes a single air guide device air foil that carries out the functions of the main air foil and of the auxiliary after-air foil. Such an air guide device air foil may also integrate the rear bumper. In lieu of the through-flow gap 42, such an air guide device-air foil may be provided with through-flow openings for a gap-flow which enhances the attachment of the lower partial flow along the outside of the air guide device-air foil.

Figure 7:
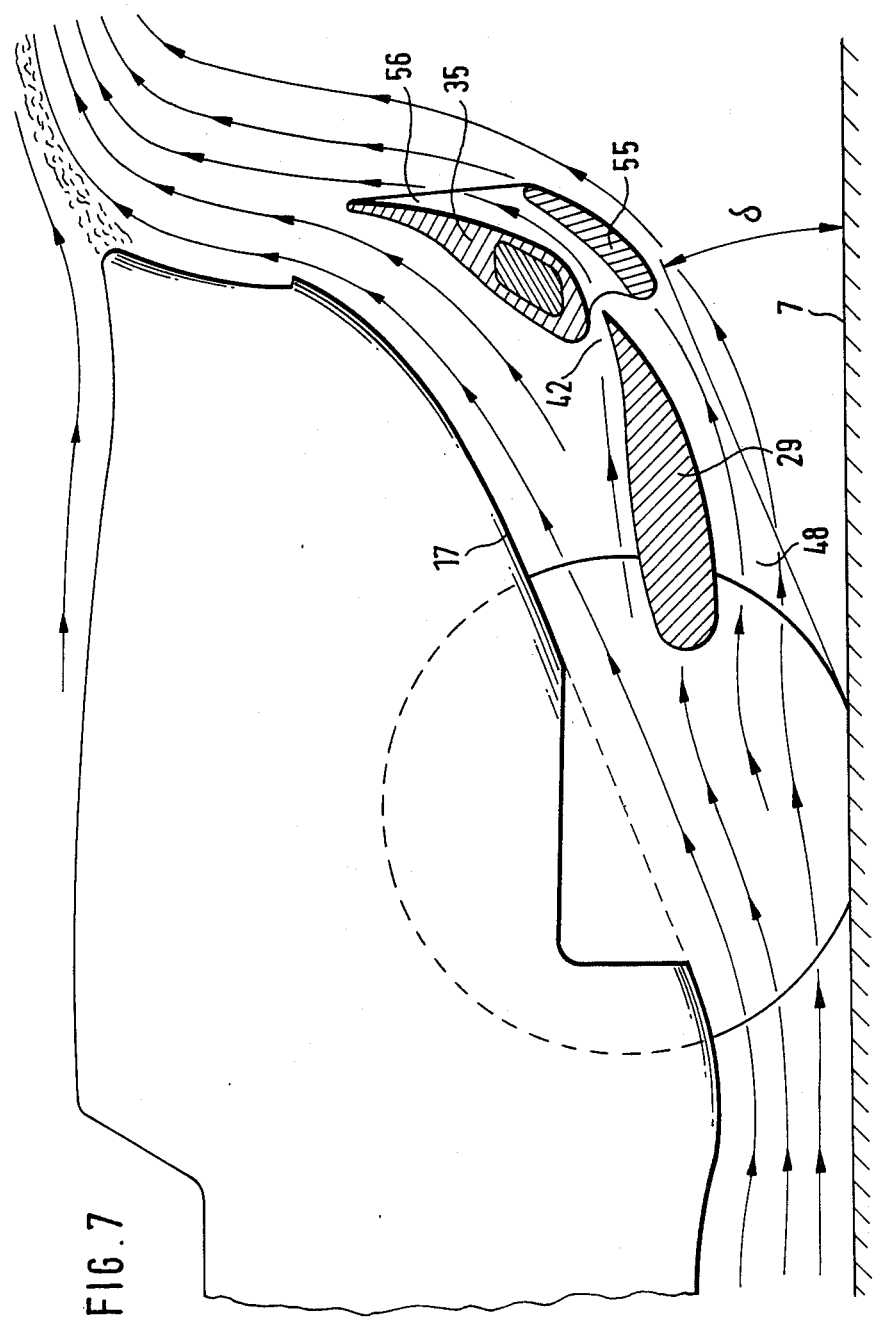
FIG. 7 is a schematic longitudinal cross-sectional view through a part of the rear section of a third embodiment of a passenger motor vehicle in accordance with the present invention.

According to FIG. 7, to assure a disturbance-free deflection of the lower partial stream 48, an auxiliary air foil 55 may be provided which is arranged obliquely below and to the rear of the auxiliary after-air foil 35 with a spacing from the latter. The auxiliary air foil 55 is secured by means of arms 56 at the auxiliary after-air foil 35 and with its concavely curved top side deflects the gap flow 52 which passes through the gap 42 between the air foil 29 and the auxiliary air foil 35, upwardly and enhances by its curved overall configuration the deflection of the lower partial stream 48 which flows partially along the concavely curved top side and partially along the convexly curved bottom side of the auxiliary air foil 55. The air guide device constituted by the air foil 29, the auxiliary after-air foil 35 and the auxiliary air foil 55 is thereby so arranged that the ground clearance is at least as large as that of the forward area of the rear floor 17 and additionally the boundary curb angle δ is kept open.

Figure 8:
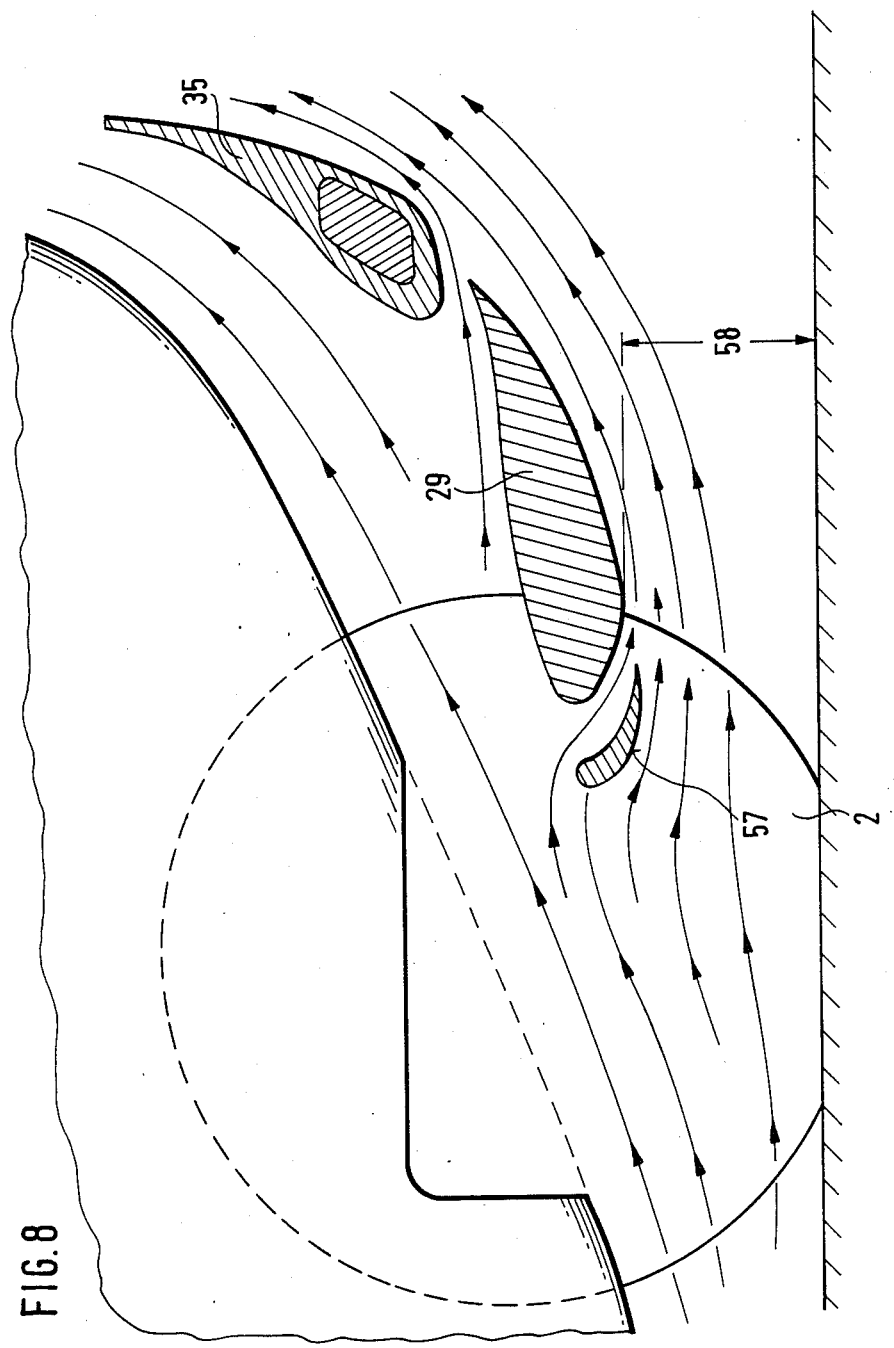
FIG. 8 is a schematic longitudinal cross-sectional view through a part of the rear section of a fourth embodiment of a passenger motor vehicle in accordance with the present invention.

According to FIG. 8, a pre-air foil 57 is arranged ahead of the air foil 29 which has the task to conduct to the air foil 29 undisturbed in-flow-air from the floor-near areas. The pre-air foil 57 is arranged altogether in the space between the two vehicle rear wheels 2. It is not necessary within this space to maintain the curb clearance 58 with a height of about 140 mm. to about 160 mm. which must be observed for the air guide device, i.e., especially for the air foil 29 to the rear of the rear vehicle wheels. Depending on the intended use conditions of the vehicle, a smaller ground clearance of about 80 mm. to about 120 mm. can be accepted in the space between the vehicle rear wheels 2.

Deviating from the heretofore described embodiments in which the air guide device is in each case rigidly secured at the vehicle body whereby always a constant arrangement of the air foils relative to the rear floor is assured, but different ground clearance distances may result depending on the downward spring strokes, provision may be made according to the present invention that an air foil is retained at the vehicle body changeable in its position so that its ground clearance can be kept far-reachingly constant independently of the downward spring strokes.

Figure 9:
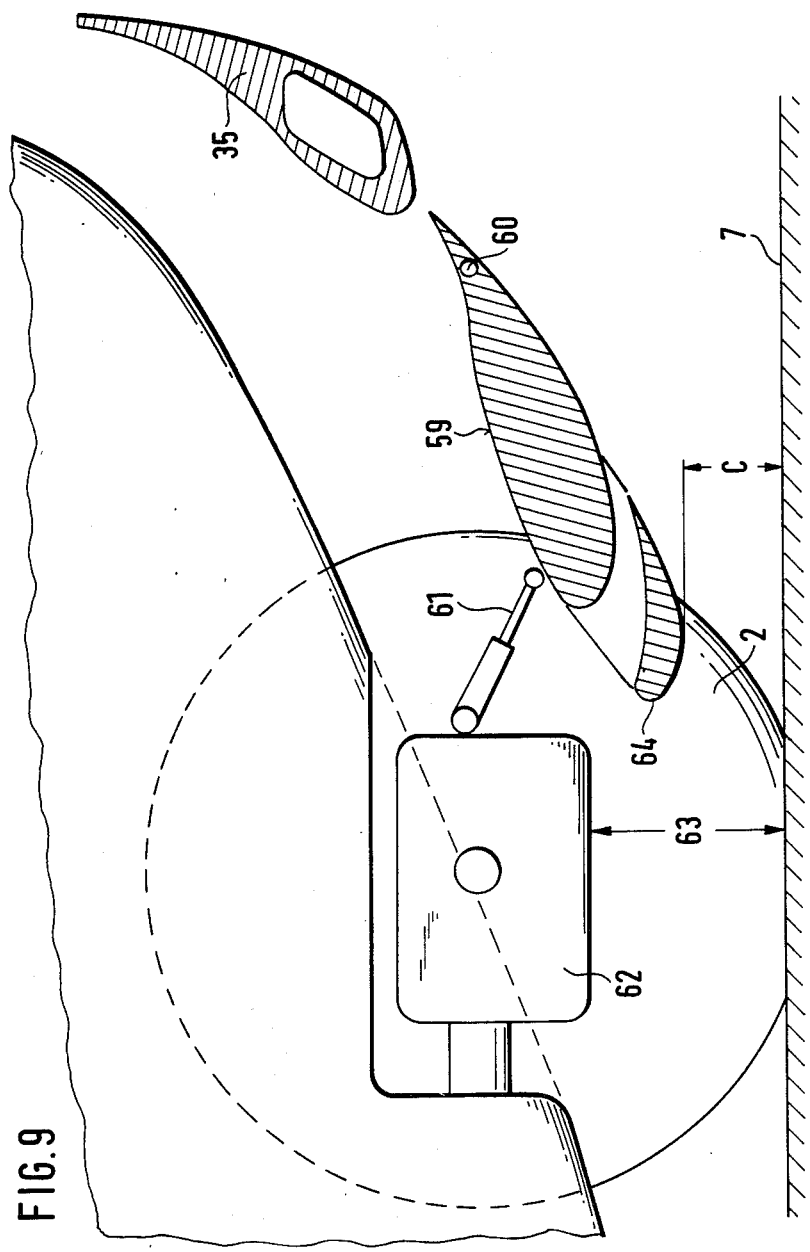
FIGS. 9 to 11 are schematic longitudinal cross-sectcional views of a part of the rear section of a fifth embodiment of a passenger motor vehicle illustrating the vehicle under different load conditions.
Figure 10:
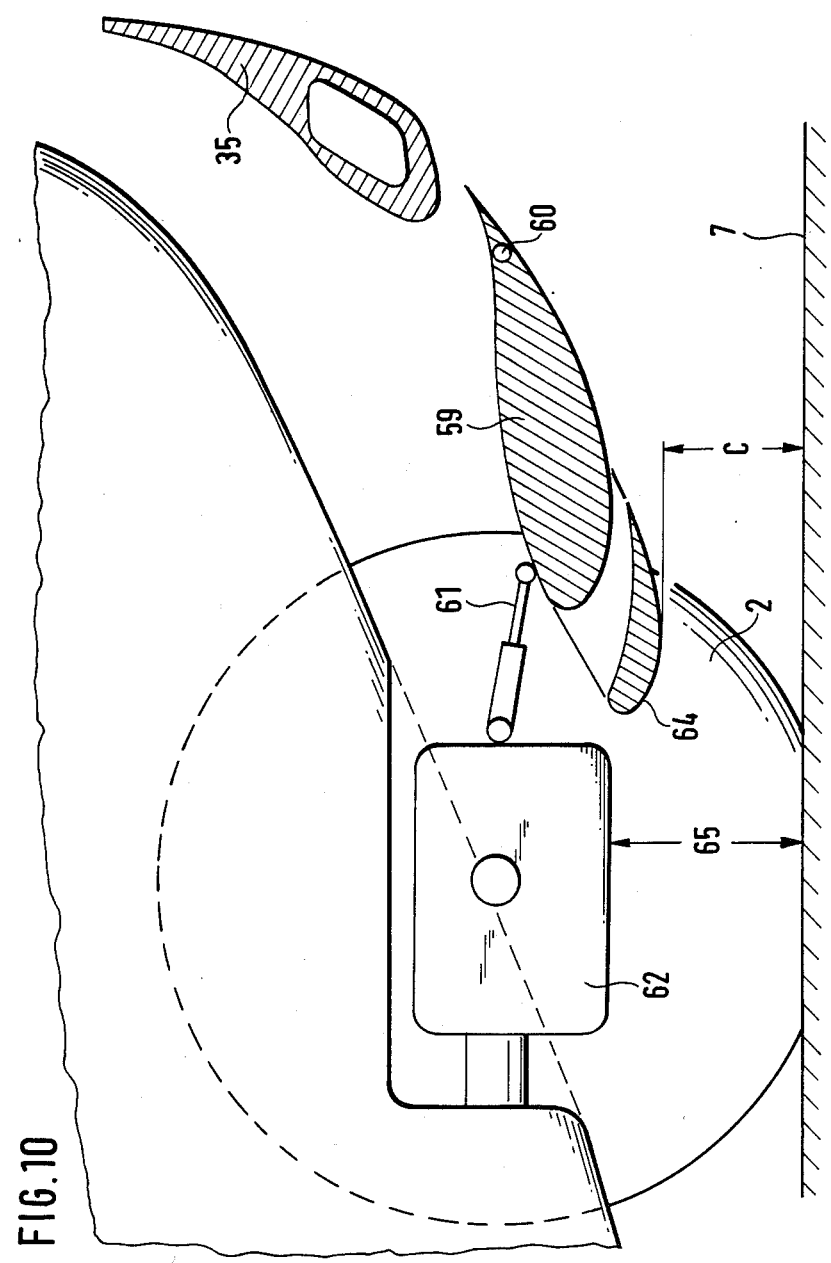
Figure 11:
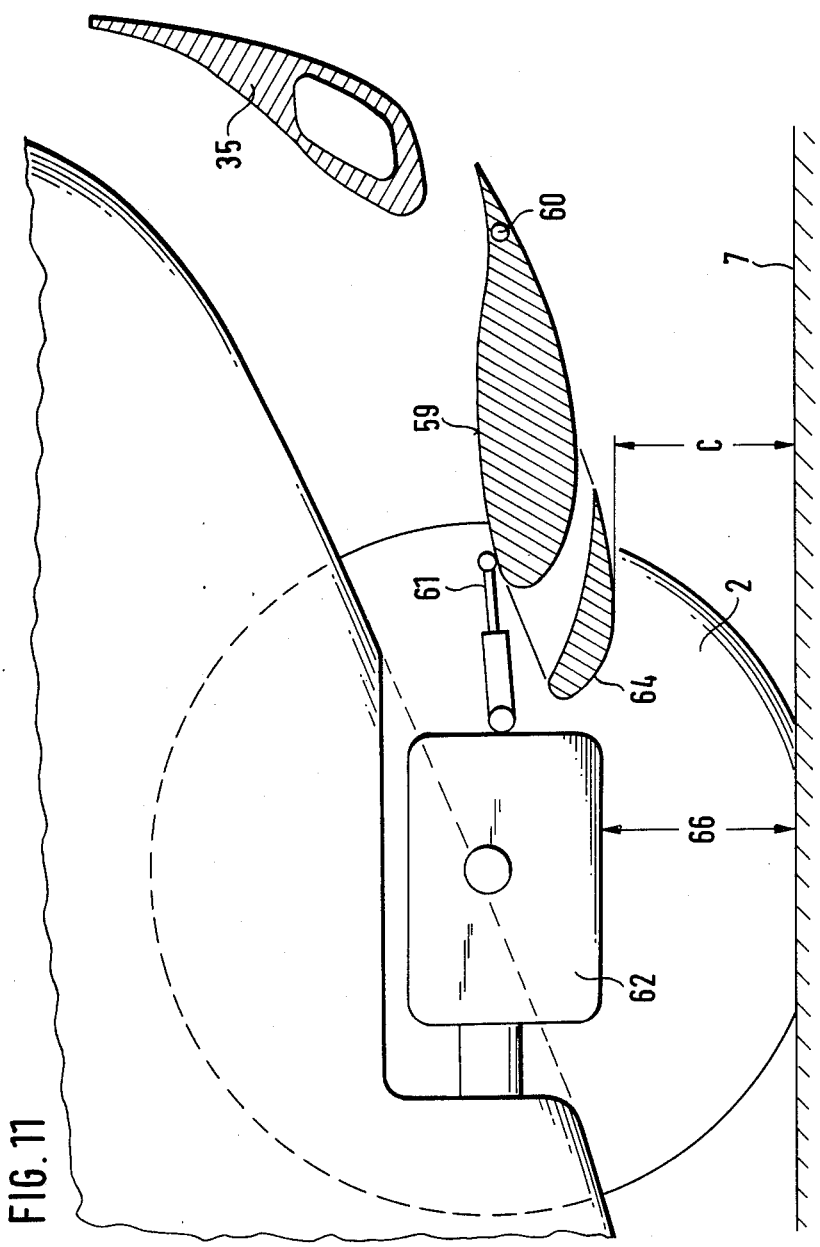

According to FIGS. 9 to 11, provision is made that an air foil 59 is pivotally secured in proximity of its rear end at the vehicle body by means of a pivot bearing 60. An adjusting mechanism 61 engages in proximity of the forward end of the air foil 59 which is pivotally connected with the rear axle transmission housing 62 but may also be connected with another body part. In FIGS. 9 to 11, three different positions are illustrated which result at different loads of the vehicle. FIG. 9 illustrates the position which will establish itself if only one driver represents the load of the otherwise empty vehicle. The vehicle body is far-reachingly lifted by the rear axle springs and the rear axle transmission housing 62 has the maximum ground clearance 63 of about 200 mm. The adjusting mechanism 61 is extended so that a pre-air foil 64 secured at the air foil 59 has a ground clearance C of about 120 mm. within the space between the vehicle rear wheels 2. FIG. 10 illustrates an intermediate position in which the vehicle carries a medium load, for example, in which a five-seater passenger motor vehicle is occupied by three persons. With this load, the rear axle transmission housing 62 only still has a medium ground clearance 65 of about 160 mm. The adjusting mechanism 61 is somewhat retracted so that the ground clearance C of the pre-air foil 64 is maintained unchanged. FIG. 11 illustrates the condition with maximum permissive load of the vehicle. The rear axle transmission housing 62 only has still a minimum ground clearance 66 of about 120 mm. under this load condition. The adjusting mechanism 61 has effected a further pivoting of the air foil 59 together with the pre-air foil 64 rigidly secured at the same so that also in this load condition, the ground clearance C of the pre-air foil 64 is maintained.

The pivotal adjustment of the air foil 59 can take place controlled as also regulated in dependence on the static downward spring strokes. Additionally, the adjusting mechanism can be so constructed that dynamic height changes, which additionally result during the drive, are taken into consideration and the air foil 59, respectively, its pre-air foil 64 always maintains far-reachingly the same ground clearance. Differing from the illustrated embodiment, the forward end of the air foil, in lieu of being connected with the vehicle body, may be connected with a structural part or component fixed with the wheel so that always a constant predetermined ground clearance is maintained. Im lieu of a pivot bearing, a translatory displacement of the air guide device may also be provided.

Owing to the adjustability of the air foil 59 together with the pre-air foil 64, it is achieved in an advantageous manner that air is always seized by the air guide device from areas as close to the floor as possible, independently of the respective instantaneous height position of the vehicle body, so that of the air flowing along underneath the vehicle, as large as possible a proportion reaches the space between the air guide device which is formed by the pre-air foil 64, the air foil 59 and the after-air foil 35, and the rear floor 17. Additionally, the adjustability of the air foil 59 together with the pre air foil 64 brings about that the overall configuration of the air guide device adapts itself in a favorable manner to the respective spacing of the rear floor 17 from the road surface 7. Differing from the illustrated embodiment, the adjustment can also take place in such a manner that not a constant ground clearance of the pre-air foil 64, respectively, of the air foil 59 is maintained but instead the ground clearance of the air guide device also increases from a minimum value which exists at the lowest height position of the vehicle body, starting with increasing height position of the vehicle body in dependence on the same, however, to a lesser extent than the height of the vehicle body, for example, changes proportional thereto.

Figure 12:
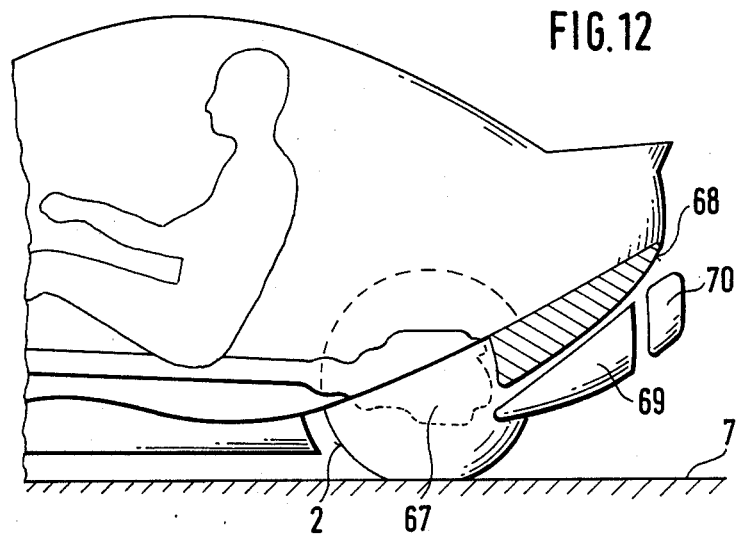
FIG. 12 is a schematic longitudinal cross-sectional view through the rear section of a sixth embodiment of a passenger motor vehicle in accordance with the present invention.
Figure 13:
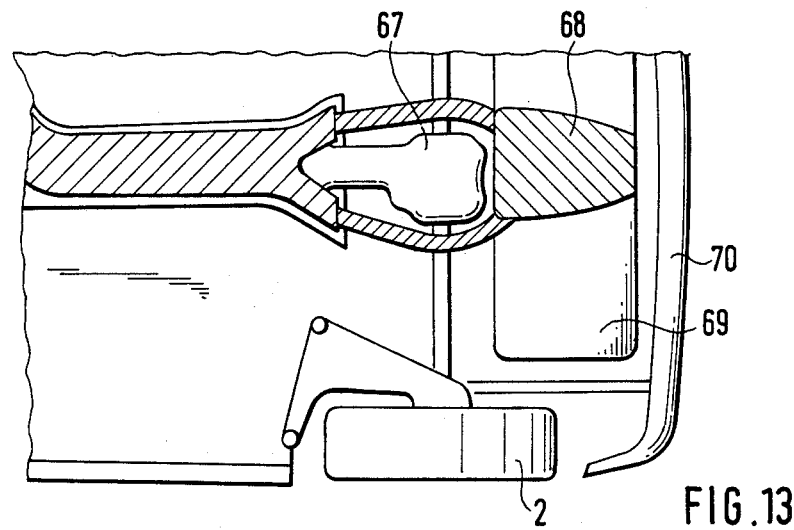
FIG. 13 is a schematic bottom plan view of the passenger motor vehicle according to FIG. 12.

According to FIGS. 12 and 13, an aerodynamically constructed displacement body 68 is provided at the bottom side of the vehicle body above an air foil 69 within the space to the rear of the rear axle transmission housing 67; an after-air foil 70 is series-connected to the rear of the air foil 69. It is achieved by the displacement body 68 that disturbances of the air flow which might be caused by the rear axle transmission housing 67 are far-reachingly avoided so that the effectiveness of the air guide device is assured far-reachingly undisturbed. The displacement body 68 may at the same time be constructed as a component of the exhaust installation, for example, as rear-muffler, or may be constructed as component of a luggage space in which it may form a trough-shaped recess.

Figure 14:
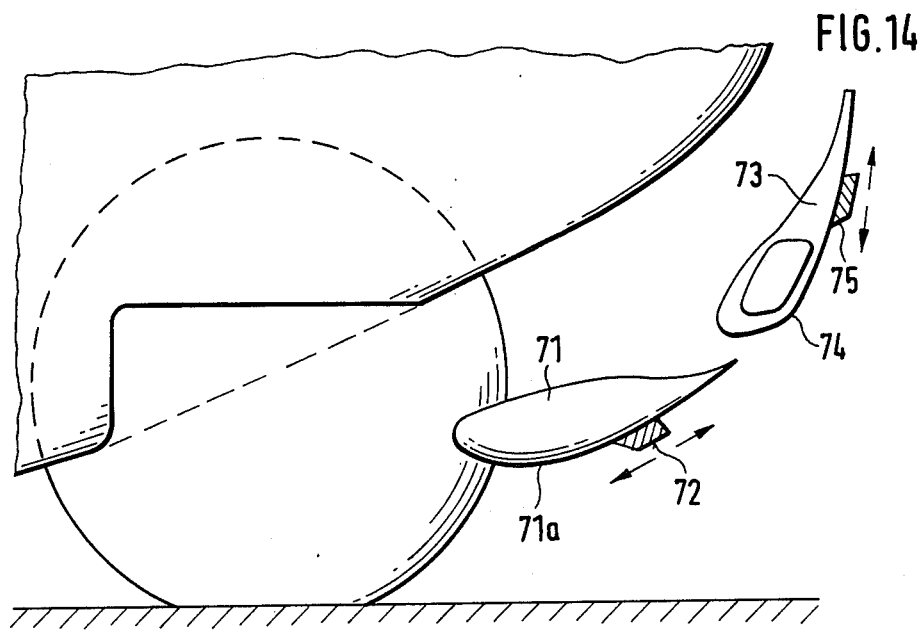
FIG. 14 is a schematic longitudinal cross-sectional view through a part of the rear section of a seventh embodiment of a passenger motor vehicle in accordance with the present invention.

In the embodiment according to FIG. 14, turbulence generators 72 are arranged at an air foil 71, and more particularly at the bottom side 71a of the air foil 71 spaced approximately one-third of the length of the air foil 71 from the rear end of the air foil 71. In a corresponding manner, an after-air foil 73, which is series-connected to the rear of the air foil 71, is provided at its backside 74 with turbulence generators 75, and more particularly slightly above the center of the backside 74. Within the area of the detachment-endangered flow, supply an energy-rich external flow to the wall-near flow. A flow detachment is prevented thereby or at least reduced.

FIGS. 15 to 19 illustrate some embodiments of such turbulence generators, so-called vortex generators. The in-flow direction is indicated in each case by an arrow V.

Figure 15:
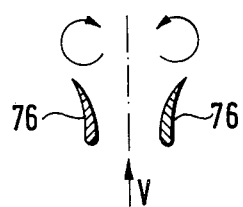
FIGS. 15 to 19 are schematic views of several embodiments of turbulence generators for use with the present invention.

According to FIG. 15, small air-foil-shaped profiles 76 are provided symmetrically to the flow direction and at a distance from one another which are disposed perpendicular on the convex circumcirculated air foil side and point away from the same.

Figure 17:
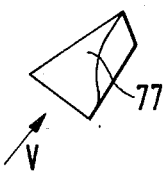
Figure 16:
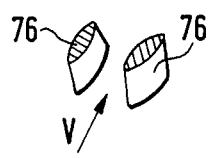

According to FIG. 17, an approximately tetrahedrally shaped body 77 is provided as vortex generator.

Figure 18:
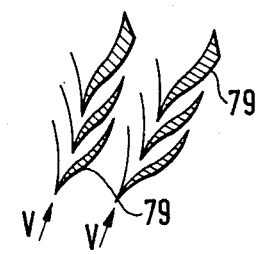
Figure 19:
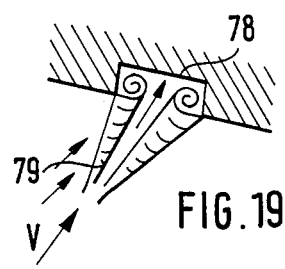

According to FIGS. 18 and 19, the circumcirculated air foil side is provided with a recess 78 which extends in the flow direction, and in which small air foils 79 are arranged that effect a vortexing of the flow into the recessed bottom.

In the embodiment according to FIGS. 20 to 22, an air foil 80 is constructed as part of the exhaust installation, namely, as rear-muffler. The silencing takes place in the middle part 81 of the air foil 80, as viewed in the in-flow direction. Within this part of the air foil 80, a forward muffler or silencing chamber 82, a middle muffler or silencing chamber 83 and a rear muffler or silencing chamber 84 are arranged which extend each transversely to the in-flow direction approximately over the entire length of the air foil 80, occupy the entire height of the center part 81 of the air foil 80 and adjoin one another. The forward part of the air foil 80, as viewed in the in-flow direction, is constructed also aerodynamically as nose cap 85. The rear part 86 of the air foil 80 is also constructed aerodynamically and serves at the same time as radiation protection covering. The exhaust end line 87 protrudes from the rear muffler chamber 84 through the rear part 86 of the air foil 80 and terminates within the center area of the air foil 80 transverse to the in-flow direction with four exhaust openings 88 in the rear edge of the air foil 80 which are arranged symmetrically to the center line 88 of the air foil 80 extending in the in-flow direction. The exhaust openings 88 each have a dimension in the vehicle transverse direction which is several times as large as the opening dimension in the vertical direction. The exhaust end line 87 is directed with its exhaust openings 88 toward the lower area of the backside 39 of the after-air foil 35 which is series-connected to the rear of the air foil 80. The flow direction of the exhaust gases is indicated in FIG. 20 by an arrow 90.

It is achieved by this construction that the air foil 80 fulfills simultaneously several functions so that a structural simplification of the vehicle results therefrom. Therebeyond, it is achieved that also the exhaust gases which are guided with high velocity along the vacuum side of the auxiliary air foil 35 in contour-proximity, owing to which a very high vacuum results at this place, contribute to the achievement of negative lift.

Figure 23:
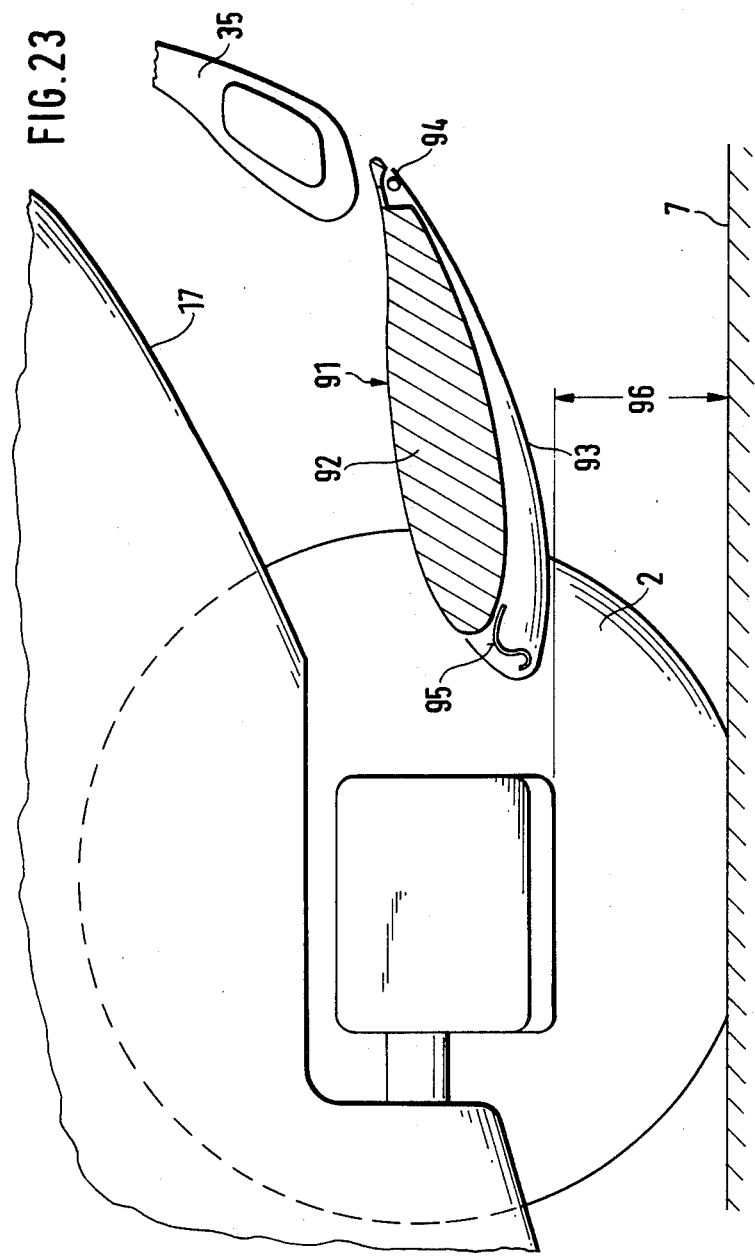
Figure 24:
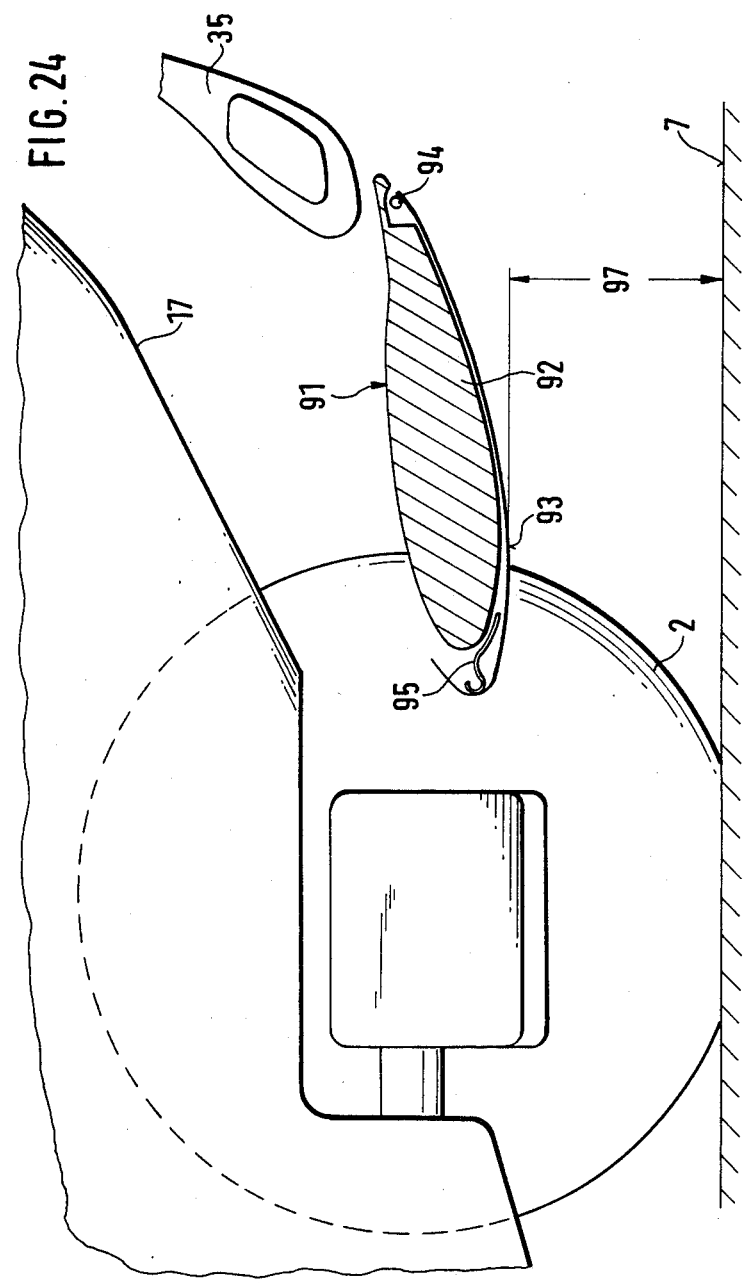

Differing from the embodiments described so far in which the respective air foil has a predetermined always constant cross section, an air foil generally designated by reference numeral 91 has in the embodiment according to FIGS. 23 and 24 a variable cross section. The air foil 91 essentially consists of an air foil main body 92 and of an air foil shell 93. The air foil main body 92 forms with its top side essentially the top side (pressure side) and with its rear end the rear edge of the air foil 91. The air foil shell 93 forms essentially the bottom side (vacuum side) and the front edge of the air foil 91. The air foil shell 93 is pivotally supported with its rear end at 94 in the rear area of the air foil main body 92 at the latter. The pivot bearing 94 enables to the air foil shell 93 relative movements in the height direction with respect to the air foil main body 92. In the operating position (FIG. 23) the air foil shell 93 is lowered as far as possible. In this position, it is held against an abutment (not shown) by a spreading spring 95 which is supported, on the one hand, at the forward end of the air foil main body 92 and, on the other, at the forward end of the air foil shell 93. The free end of the air foil shell 93 is directed rearwardly, extends up to the forward end of the air foil main body 92 except for a small distance and forms the forward end of the top side of the air foil 91.

In the operating position, the air foil shell 93 has as small as possible a ground clearance 96 which is determined by regulations or by the requirements of the practical driving operation. The air guide shell 93 can be lifted from the operating position into the deflected end position (FIG. 24) against the force of the spreading spring 95 up to abutment at the bottom side of the air foil main body 92. In this position, the air guide shell 93 has a ground clearance 97 which is considerably greater than the ground clearance 96 in the operating position. For example, the ground clearance 97 may be larger than the ground clearance 96 by about 25%.

The arrangement of the movable air guide shell 93 makes it possible, on the one hand, to provide an air foil with smallest possible ground clearance in the operating position which, by reason of the high in-flow velocity and the high vacuum at the air foil bottom side, produces a large negative lift action, and, on the other hand, when driving backwards, can drive with the vehicle rear section over relatively high obstacles, for example, a high curbstone, which deflects the air guide shell 93 in the upward direction without damaging the air guide device, as might be the case, for example, when parking in a reverse direction.

Figure 25:
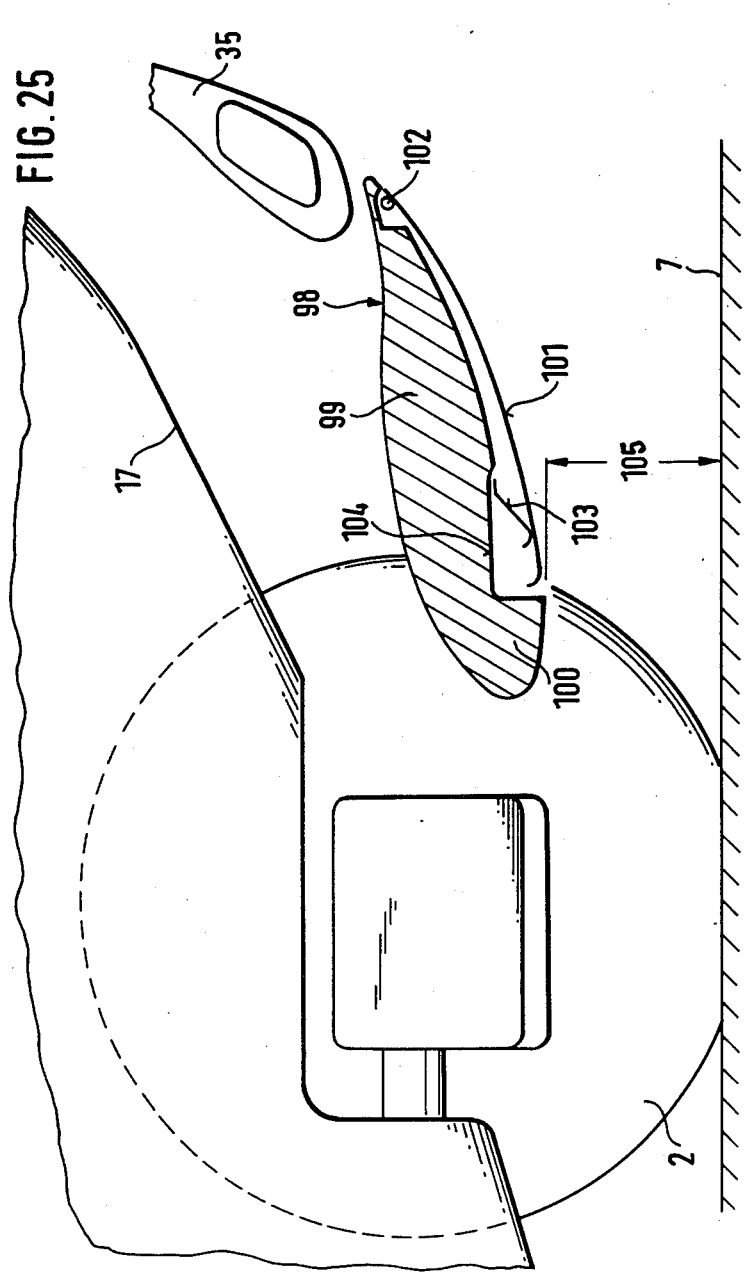

In the embodiment according to FIGS. 25 and 26, an air foil generally designated by reference numeral 98 with a changeable cross section is also provided. An air foil main body 99 protrudes approximately with its forward third into the space between the vehicle rear wheels 2. It forms with its top side the top side (pressure side) of the air foil 98, with its rear end, the rear edge of the air foil 98, with its forward end the forward edge of the air foil 98, and with the bottom side of its forward part 100, the forward part of the bottom side (vacuum side) of the air foil 98. To the rear of the forward part 100, the air foil main body 99 is not shaped corresponding to the aerodynamic requirements, but is kept flat. An air foil or air guide shell 101 is pivotally secured pivotal in the vertical direction in the rear area of the air foil main body 99; the air guide shell 101 extends from the pivot bearing 102 forwardly up to the forward part 100 of the air foil main body 99. In its lowest end position, the operating position, which is illustrated in FIG. 25, the forward end of the bottom side of the air guide shell 101 adjoins the rear end of the bottom side of the forward part 100 of the air foil main body 99 and forms the rear part of the bottom side (vacuum side) of the air foil 98. Its forward end reaches slightly into the space between the vehicle rear wheels 2. It is kept in the operating position by a spreading spring 103 which is arranged in a pocket 104 of the air foil main body 99; from the operating position it can be deflected upwardly up to abutment at the air foil main body 99 against the force of the spreading spring 103. In the operating position in which the air guide shell 101 is in its lowest end position, the air guide shell 101 has a ground clearance 105 which, taking into consideration the regulations and the requirements of the practical driving operation, is as small as possible in order to produce as large as possible a negative lift. In the deflected end position, in which the air guide or air foil shell 101 is lifted against the force of the spreading spring 103 up to abutment at the bottom side of the rear part of the air foil main body 99 (FIG. 26), the air guide shell 101 has a ground clearance 106 which is larger by about one-fourth than the ground clearance 105 which the air guide shell 101 has in the operating position.

Also this embodiment enables as low as possible an arrangement of the air foil 98 for a favorable operating manner and nonetheless the rearward parking at a relatively high obstruction, for example, at a high curbstone, with respect to which the air guide shell 101 deflects yieldingly. The construction of the forward part of the air foil 98 as component of the air foil main body 99 additionally assures a completely satisfactory pressure build-up at the forward part of the air foil 98 which, by reason of its arrangement between the vehicle rear wheels 2 can remain in its low position also during the rearward parking at high obstacles.

In order to achieve a good efficiency over the entire width of the air foil and of the auxiliary air foil, air guide walls (not shown) may be provided at the air foil ends or in their proximity at the vehicle sides which extend in the vehicle longitudinal direction. They may be fastened both at the vehicle body as also at the air foil ends.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

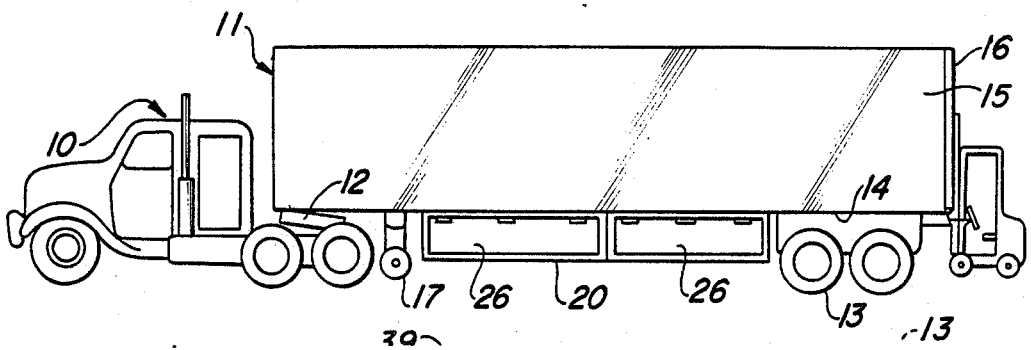

We claim:

1. A motor vehicle, especially a passenger motor vehicle, with a rear axle and with vehicle floor means including rear floor means, in which for achieving a good road grip of the vehicle floor means is constructed in its rear area essentially smooth-surfaced and rising toward the vehicle end, air foil means arranged in the space underneath the rising rear floor means at which a negative lift becomes effective during air in-flow from the vehicle front section, the forward end of the rising rear floor means being arranged at least within the area of the vehicle rear axle, the rising rear floor means forming the top side of a rear diffusor means whose bottom side is formed by the road surface, and at the vehicle end having a considerable spacing from the road surface, the air foil means being so arranged that it protrudes with its forward end into the space between the vehicle rear wheels and its bottom side has at least the same distance from the road surface as the vehicle floor means at its lowest place in the vehicle areas located in front of the vehicle rear section.

2. A motor vehicle according to claim 1, wherein the air foil means protrudes approximately with its forward third into the space between the vehicle rear wheels.

3. A motor vehicle according to claim 1, wherein the forward end of the rising rear floor means is arranged at least approximately within the area in front of a rear axle suspension.

4. A motor vehicle according to claim 1, wherein the transition from the area of the vehicle floor means arranged in front of the rising rear floor means to the rising rear floor means takes place gradually and is constructed rounded-off.

5. A motor vehicle according to claim 1, wherein the vehicle floor means is constructed far-reachingly smooth-surfaced within the area in front of the rising rear floor means.

6. A motor vehicle according to claim 1, wherein the rising rear floor means has at least in the center area between the forward and rear adjoining areas thereof an essentially constant slope and the angle of inclination subtended by the rear floor means rising from the center area and the horizontal amounts to about 10° to about 40°.

7. A motor vehicle according to claim 6, wherein the angle of inclination amounts to about 25°.

8. A motor vehicle according to claim 6, wherein the rising rear floor means has in the rear area a gradually increasing slope toward the rear end of the rising rear floor means and an angle of inclination at the rear end with respect to the horizontal of about 40° to about 90°.

9. A motor vehicle according to claim 8, wherein the last-mentioned angle of inclination is about 70°.

10. A motor vehicle according to claim 1, wherein the rear end of the rising rear floor means adjoins an essentially at least approximately vertically arranged rear closure wall of the vehicle.

11. A motor vehicle according to claim 10, wherein a detachment edge is provided at the rear end of the rising rear floor means.

12. A motor vehicle according to claim 1, wherein the air foil means is arranged essentially flat.

13. A motor vehicle according to claim 1, wherein an auxiliary air foil means is connected in series to the rear of and at a distance from the air foil means, a negative lift force being also effective at the auxiliary air foil means during an air in-flow coming from the vehicle front section.

14. A motor vehicle according to claim 13, with a rear bumper means, wherein the auxiliary air foil means forms a structural unit together with the rear bumper means.

15. A motor vehicle according to claim 14, wherein the rear bumper means is integrated into the auxiliary air foil means.

16. A motor vehicle according to claim 13, wherein the first-mentioned air foil means is coordinated approximately to the rear half of the center area of the rising rear floor means and the auxiliary air foil means is coordinated to the rear area of the rising rear floor means.

17. A motor vehicle according to claim 13, wherein the first-mentioned air foil means is arranged essentially flat and the auxiliary air foil means essentially steep.

18. A motor vehicle according to claim 13, wherein the rear end of the first-mentioned air foil means is arranged underneath the forward end of the auxiliary air foil means.

19. A motor vehicle according to claim 18, wherein a through-flow gap is provided between the rear end of the first-mentioned air foil means and the forward end of the auxiliary air foil means which has a gap width of about 10 to about 60 mm.

20. A motor vehicle according to claim 13, wherein the distance of the air guide device formed by the first-mentioned air foil means and the auxiliary air foil means from the rising rear floor means becomes initially larger from in front toward the rear and becomes smaller again in the rear area.

21. A motor vehicle according to claim 20, wherein the distance of the forward end of the first-mentioned air foil means from the rising rear floor means becomes approximately as large as or larger than the distance of the rear end of the auxiliary air foil means from the rear end of the rising rear floor means.

22. A motor vehicle according to claim 13, wherein the interior width between the rear end of the auxiliary air foil means and the rising rear floor means amounts to about 30 mm. to about 200 mm.

23. A motor vehicle according to claim 13, wherein the rear area of the auxiliary air foil means forms together with the rear area of the rising rear floor means a line with a cross section remaining substantially constant for over its length or a nozzle with an essentially upwardly and slightly rearwardly directed exit flow direction.

24. A motor vehicle according to claim 13, wherein the rear area of the auxiliary air foil means subtends with the horizontal an angle of about 50° to about 90°.

25. A motor vehicle according to claim 13, characterized in that the rear area of the auxiliary air foil means has only a slight tapering and terminates essentially blunt.

26. A motor vehicle according to claim 25, wherein the rear area of the auxiliary air foil means has a thickness of about 10 mm. to about 60 mm.

27. A motor vehicle according to claim 13, wherein a further auxiliary air foil means is arranged to the rear of the through-flow gap present between the rear end of the first-mentioned air foil means and the forward end of the first-mentioned auxiliary air foil means.

28. A motor vehicle according to claim 13, wherein a pre-air foil means is coordinated to the first-mentioned air foil means, said pre-air foil means being arranged inside of the envelope curve of the vehicle rear wheels and its bottom side having a smaller distance from the road surface than the bottom side of the first-mentioned air foil means.

29. A motor vehicle according to claim 28, wherein the first-mentioned air foil means is supported adjustable in the vertical direction at a fixed vehicle part.

30. A motor vehicle according to claim 29, wherein the support includes a pivotal connection.

31. A motor vehicle according to claim 30, wherein the pivotal connection is provided within the rear area of the first-mentioned air foil means.

32. A motor vehicle according to claim 29, further comprising an air foil height-adjusting means.

33. A motor vehicle according to claim 32, wherein the air foil height-adjusting means is operable automatically in dependence on the height position of the vehicle body.

34. A motor vehicle according to claim 29, wherein the first-mentioned air foil means is operatively connected for purposes of adjustment with at least one of the supports of the vehicle rear wheels.

35. A motor vehicle according to claim 13, wherein at least one of the first-mentioned air foil means and the auxiliary air foil means includes vortex generator means on the vacuum side thereof.

36. A motor vehicle according to claim 1, wherein the air foil means is constructed as muffler.

37. A motor vehicle according to claim 36, wherein said muffler is a rear muffler.

38. A motor vehicle according to claim 36, wherein the muffler includes damping chamber means arranged in a center part of the air foil means as viewed in the in-flow direction.

39. A motor vehicle according to claim 36, wherein the rear part of the air foil means is constructed as radiation protection covering.

40. A motor vehicle with an exhaust end line according to claim 36, wherein the outflow end of the exhaust end line is arranged in the rear edge of the air foil means.

41. A motor vehicle according to claim 40, wherein an auxiliary air foil means is connected in series to the rear of and at a distance from the air foil means, a negative lift force being also effective at the auxiliary air foil means during an air in-flow coming from the vehicle front section.

42. A motor vehicle according to claim 41, wherein the exhaust end line is directed toward the forward area of the vacuum side of the auxiliary air foil means.

43. A motor vehicle according to claim 1, wherein the air foil means has a variable cross section.

44. A motor vehicle according to claim 43, wherein the bottom side of the air foil means is constructed at least in part as air guide shell means which is pivotally secured with its rear end about a substantially horizontal axis at the rear end of an air foil main body which, as to the rest, forms the air foil means, between a lower end position and an upper end position.

45. A motor vehicle according to claim 44, wherein at least one spreading spring means is provided between the air foil main body and the air guide shell means.

46. A motor vehicle according to claim 44, wherein the air guide shell means protrudes beyond the forward end of the air foil main body.

47. A motor vehicle according to claim 44, wherein the air guide shell means extends essentially only over the part of the air foil main body which is arranged outside of the envelope curve of the vehicle rear wheels, and in its lower end position adjoins the bottom side of the forward part of the air foil main body arranged between the vehicle rear wheels.

48. A motor vehicle according to claim 1, wherein air guide walls are provided at the vehicle sides within the rear area which extend essentially in the vehicle longitudinal direction.

49. A motor vehicle according to claim 48, wherein the air guide walls extend from the vehicle body downwardly to approximately at the height of the air foil means.

50. A motor vehicle according to claim 49, wherein the air guide walls are arranged at the ends of the air foil means.

51. A motor vehicle according to claim 13, wherein the air guide walls extend from the vehicle body downwardly to approximately at the height of the air foil means and the auxiliary air foil means.

52. A motor vehicle according to claim 51, wherein the air guide walls are arranged at the ends of the air foil means and of the auxiliary air foil means.

* * * * *

United States Patent [19]

Amy

[11] Patent Number: 4,772,063
[45] Date of Patent: Sep. 20, 1988

[54] TRAILER FOR HAULING AUTOMOTIVE EXHAUST SYSTEM PARTS

[76] Inventor: David T. Amy, 15434 Bealfred Dr., Fenton, Mich. 48430

[21] Appl. No.: 93,634

[22] Filed: Sep. 8, 1987

[51] Int. Cl.⁴ ............................................. B62D 25/00
[52] U.S. Cl. ..................... 296/37.1; 296/181; 296/24.1; 224/42.41; 414/347; 410/36
[58] Field of Search ..................... 296/37.1, 24 R, 181; 410/32, 36; 224/42.41; 414/347

[56] References Cited

U.S. PATENT DOCUMENTS

| | | | |
|---|---|---|---|
| 3,561,621 | 2/1971 | Riners, Jr. | 414/347 |
| 3,741,604 | 6/1973 | Heath | 296/37.1 |
| 4,418,853 | 12/1983 | Shaffer | 224/42.41 |
| 4,449,746 | 5/1984 | Clark | 296/24 R |
| 4,564,134 | 1/1986 | Seibert | 296/37.1 |

Primary Examiner—Robert R. Song
Attorney, Agent, or Firm—Cullen, Sloman, Cantor, Grauer, Scott and Rutherford

[57] ABSTRACT

A trailer for hauling and for delivery to a number of different delivery sites, automotive exhaust system parts, such as mufflers, pre-bent tail pipes and the like packed in large shipping containers, and, also, bundles of numerous straight tube lengths, is provided with a normally closed cabinet attached beneath its floor between its rear road wheels and its forward tractor connecting fifth wheel. The cabinet is divided into longitudinally elongated bins, each of about the same length as the straight tubes, for receiving and holding the bundles of straight tubes in longitudinal arrangement relative to the trailer axis. The sides of the bins are openable so that the tube bundles can be inserted and removed in a transverse direction relative to the trailer axis. A fork truck is releasably mounted upon the rear end of the trailer for use in unloading tube bundles in a transverse direction out of the bins at different delivery sites. The lengths of the containers are dimensionally close to the width of the trailer so that the containers are arranged transversely of the trailer axis for filling a substantial portion of the interior of the trailer during hauling. The containers are removable from the rear of the trailer by using a manual dolly carried within the trailer to move the containers to the rear of the trailer where the containers may be removed and carried by the fork truck at their respective delivery sites.

13 Claims, 1 Drawing Sheet